US012181821B2

(12) United States Patent
Sakai et al.

(10) Patent No.: US 12,181,821 B2
(45) Date of Patent: Dec. 31, 2024

(54) FIXING DEVICE AND IMAGE FORMING APPARATUS

(71) Applicant: KYOCERA Document Solutions Inc., Osaka (JP)

(72) Inventors: Yuhiro Sakai, Osaka (JP); Masakazu Uehara, Osaka (JP); Hironori Takahashi, Osaka (JP); Tomohiro Watatani, Osaka (JP); Shota Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/343,451

(22) Filed: Jun. 28, 2023

(65) Prior Publication Data

US 2024/0004331 A1 Jan. 4, 2024

(30) Foreign Application Priority Data

Jun. 29, 2022 (JP) ................................ 2022-104942

(51) Int. Cl.
*G03G 15/20* (2006.01)

(52) U.S. Cl.
CPC . *G03G 15/2053* (2013.01); *G03G 2215/2016* (2013.01)

(58) Field of Classification Search
CPC ................... G03G 15/2053; G03G 2215/2016
See application file for complete search history.

(56) References Cited

U.S. PATENT DOCUMENTS

2017/0255146 A1* 9/2017 Furukawa .......... G03G 15/2053
2020/0209792 A1* 7/2020 Saito .................. G03G 15/2053

FOREIGN PATENT DOCUMENTS

JP 2018-112689 A 7/2018

* cited by examiner

*Primary Examiner* — Sandra Brase
(74) *Attorney, Agent, or Firm* — Studebaker & Brackett PC

(57) ABSTRACT

A fixing device according to the present disclosure includes a rotatable endless belt and an end portion holder. The end portion holder supports each of end portions of the fixing belt rotatably, and has a cylindrical part along which an inner circumferential surface of the fixing belt slides and an end wall part which faces an end surface of the fixing belt. The end wall part has a restraint part which faces an outer circumferential surface of the fixing belt with a predetermined interval and restrains the fixing belt from turning up.

9 Claims, 6 Drawing Sheets

FIXING DEVICE AND IMAGE FORMING APPARATUS

INCORPORATION BY REFERENCE

This application is based on and claims the benefit of priority from Japanese patent application No. 2022-104942 filed on Jun. 29, 2022, which is incorporated by reference in its entirety.

BACKGROUND

The present disclosure relates to a fixing device which fixes a toner image on a sheet and an image forming apparatus including the fixing device.

In the fixing device, a belt fixing system that enables energy saving and quick start is widely known. A belt fixing type fixing device is provided with an endless fixing belt heated by a heat source, and a pressure member that forms a pressurizing area with the fixing belt and is driven to be rotated and then to rotate the fixing belt. A toner image transferred to a sheet in the pressuring area is heated and pressurized and then fixed to the sheet.

Both the end portions of the fixing belt are each rotatably supported by an end portion holder. During the fixing operation, if both the end portions of the fixing belt are misaligned or a temperature difference occurs between the end portions, the fixing belt may meander. Then, the end surface of the fixing belt slides against the end portion holder, causing the end portion of the fixing belt to be turned up or be buckled.

Therefore, in order to prevent the film (corresponding to the fixing belt) from meandering, a flange (corresponding to the end portion holder) that slidably supports the inner circumferential surface of the film may be configured such that the shape of the area in contact with the inner circumferential surface of the film and the shape of the area in contact with the end surface of the film are different on the upstream and downstream sides in the recording medium conveyance direction with respect to the fixing nip.

However, in the above fixing device, it is necessary to process the flange with high precision and to increase the assembly precision of the fixing device, which increases the cost of the fixing device. In addition, if the rotation of the fixing belt is not stable, the shape of the flange alone may not reliably prevent the meandering.

SUMMARY

A fixing device according to the present disclosure includes a rotatable endless belt and an end portion holder. The end portion holder supports each of end portions of the fixing belt rotatably, and has a cylindrical part along which an inner circumferential surface of the fixing belt slides and an end wall part which faces an end surface of the fixing belt. The end wall part has a restraint part which faces an outer circumferential surface of the fixing belt with a predetermined interval and restrains the fixing belt from turning up.

An image forming apparatus according to the present disclosure includes an image forming part which forms a toner image on a sheet; and the fixing device which fixes the toner image formed by the image forming part on the sheet.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus and a fixing device according to one embodiment of the present disclosure will be described.

Figure 1:
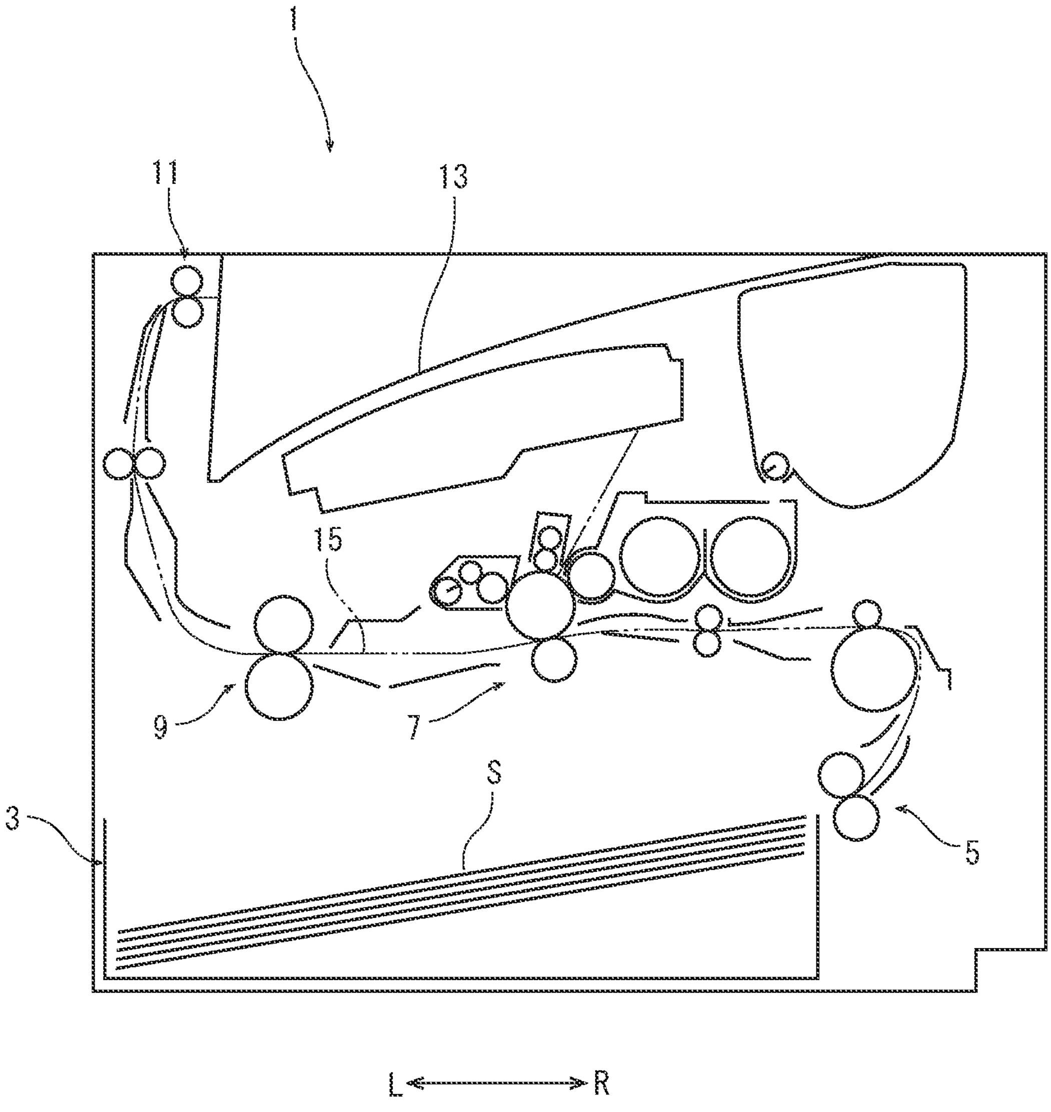
FIG. 1 is a front view schematically showing an inner structure of an image forming apparatus according to one embodiment of the present disclosure.

First, with reference to FIG. 1, an image forming apparatus 1 will be described. FIG. 1 is a front view schematically showing the inner structure of the image forming apparatus 1. Fr, Rr, L and R in each figure indicate the front, rear, left and right sides of the image forming apparatus 1, respectively.

The image forming apparatus 1 is provided with a sheet feeding cassette 3 in which a sheet S is stored, a sheet feeding device 5 which feeds the sheet S from the sheet feeding cassette 3, an image forming part 7 which forms a toner image on the sheet S, a fixing device 9 which fixes the toner image on the sheet S, a sheet discharging device 11 which discharges the sheet S, and a sheet discharge tray 13 on which the discharged sheet S is stacked. Furthermore, the image forming apparatus includes a conveyance path 15 along which the sheet S is conveyed from the sheet feeding device 5 through the image forming part 7 and the fixing device 9 to the sheet discharging device 11.

The sheet S fed from the sheet feeding cassette 3 by the sheet feeding device 5 is conveyed along the conveyance path 15 to the image forming part 7, in which a toner image is formed on the sheet. The sheet S on which the toner image is formed is conveyed along the conveyance path 15 to the fixing device 9, in which the toner image is fixed on the sheet S. The sheet S on which the toner image is fixed is discharged to the sheet discharge tray 13 by the sheet discharging device 11.

Figure 2:
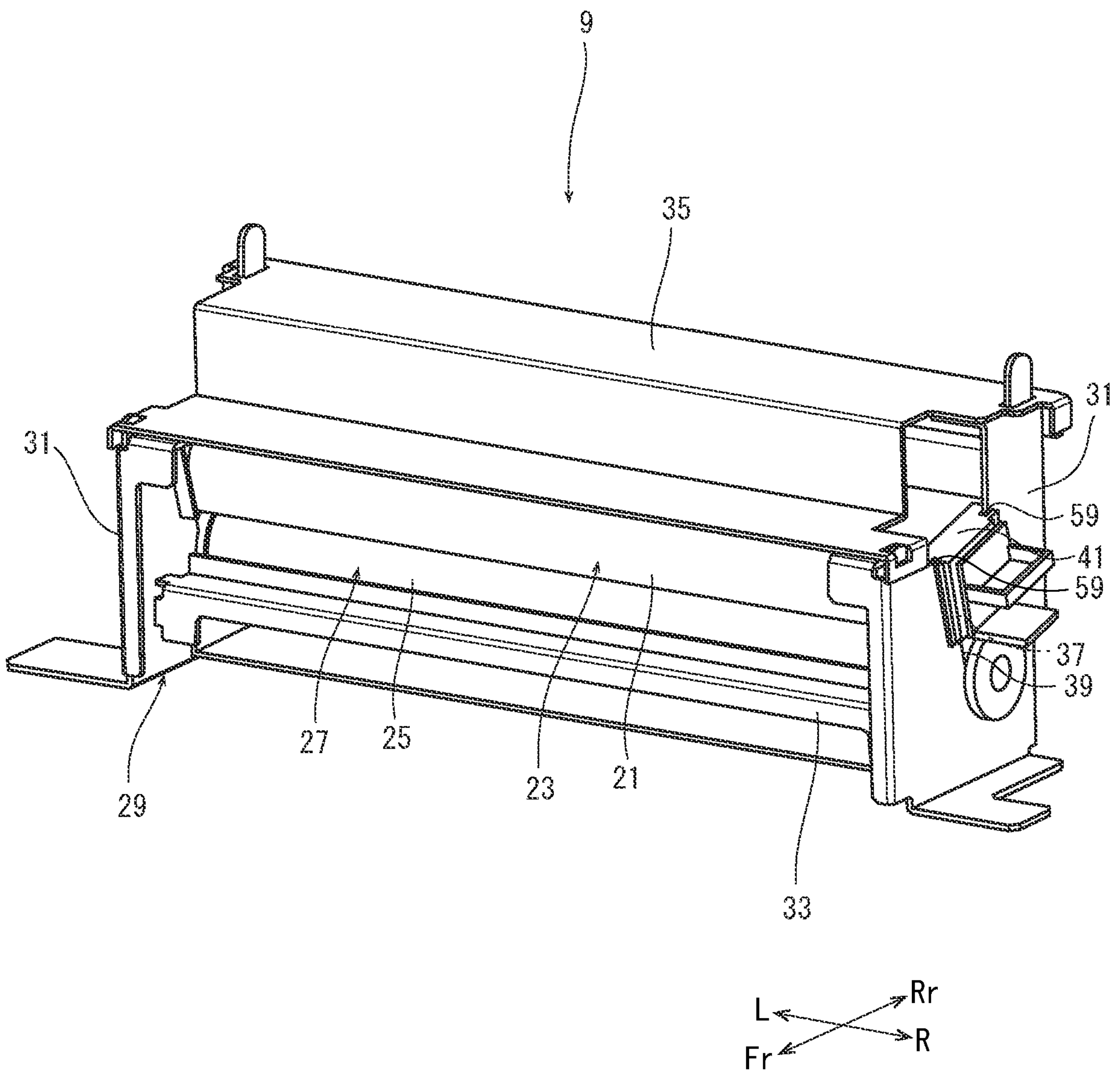
FIG. 2 is a perspective view showing a fixing device according to the embodiment of the present disclosure.
Figure 3:
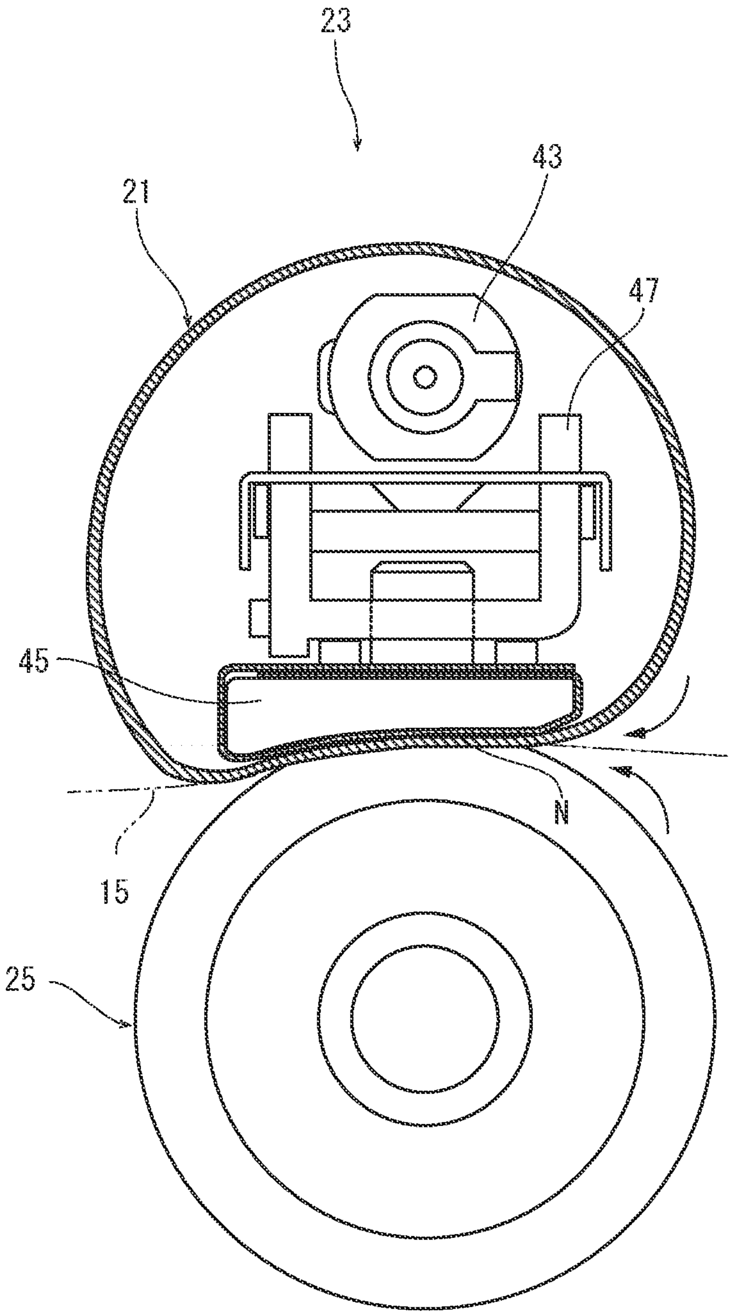
FIG. 3 is a sectional view showing a belt assembly and a pressure roller in the fixing device according to the embodiment of the present disclosure.

Next, the fixing device 9 will be described with reference to FIG. 2 and FIG. 3. FIG. 2 is a perspective view showing the fixing device 9, and FIG. 3 is a sectional view showing a belt assembly 23 and a pressure roller assembly 27.

As shown in FIG. 2, the fixing device 9 includes a belt assembly 23 to which a fixing belt 21 is attached, a pressure roller assembly 27 to which a pressure roller 25 is attached, and a fixing frame 29 by which the belt assembly 23 and the pressure roller assembly 27 are supported.

As shown in FIG. 2, the fixing frame 29 includes a pair of side plates 31, stays 33 connecting both the side plates 31, and a cover plate 35. The side plate 31 has a guide groove 37 having a predetermined width. The guide groove 37 is formed diagonally downward from the upper edge of the side plate 31. Furthermore, the side plate 31 has an approximately circular notch 39. The notch 39 has a diameter smaller than the width of the guide groove 37 and is formed continuously to the lower edge of the guide groove 37. The fixing frame 29 is made of sheet metal.

Both the end portions of the pressure roller assembly 27 are supported by the notches 39 of both the side plates 31 of the fixing frame 29, and are fastened to both the side plates 31 with screws. The pressure roller 25 is connected to a drive motor (not shown) and can be driven by the drive motor to be rotated.

The belt assembly 23 is provided with the fixing belt 21, end portion holders 41 holding both the end portions of the fixing belt, a halogen heater 43 (see FIG. 3) which heats the fixing belt 21, and a pushing member 45 (see FIG. 3) which pushes the fixing belt 21 against the pressure roller 25.

The fixing belt 21 is an endless belt with a predetermined inner diameter and a width longer than the width of the sheet. The fixing belt 21 is made of flexible material, and has a base material layer, an elastic layer provided on the outer surface of the base material layer, and a release layer provided on the outer surface of the elastic layer. The base layer is made of resin. The elastic layer is made of silicone rubber or the like. The release layer is made of a PFA tube or the like.

As shown in FIG. 3, a stay 47 penetrates the hollow of the fixing belt 21. Both the ends of the stay 47 are fixed to both the end portion holders 41.

The halogen heater 43 is fixed to the upper surface of the stay 47, and radiates radiant heat to the inner circumferential surface of the fixing belt 21 to heat the fixing belt 21. The pushing member 45 is fixed to the lower surface of the stay 47, and faces the inner circumferential surface of the fixing belt 21.

Figure 4:
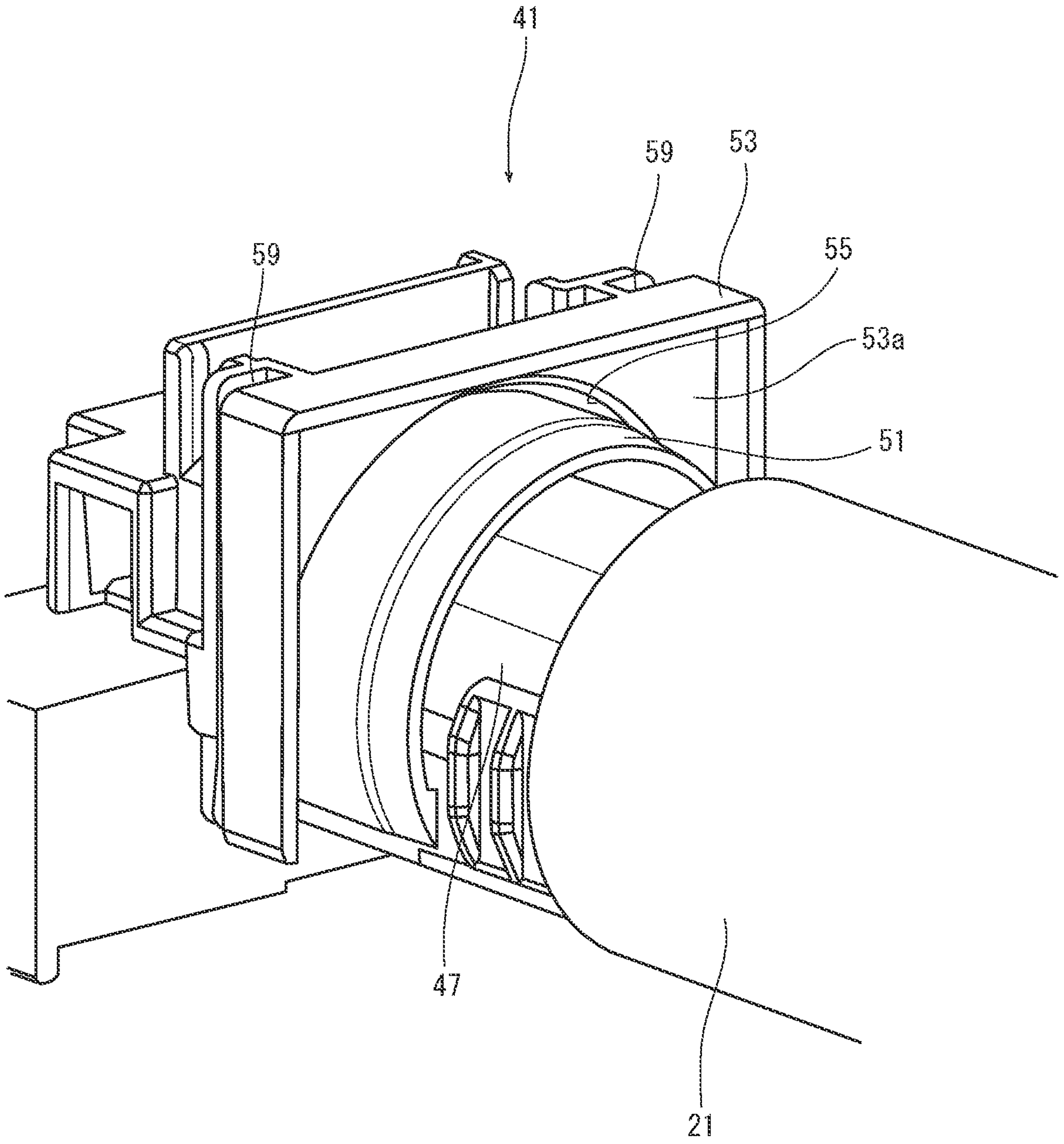
FIG. 4 is a perspective view showing an end portion holder in the fixing device according to the embodiment of the present disclosure.
Figure 5A:
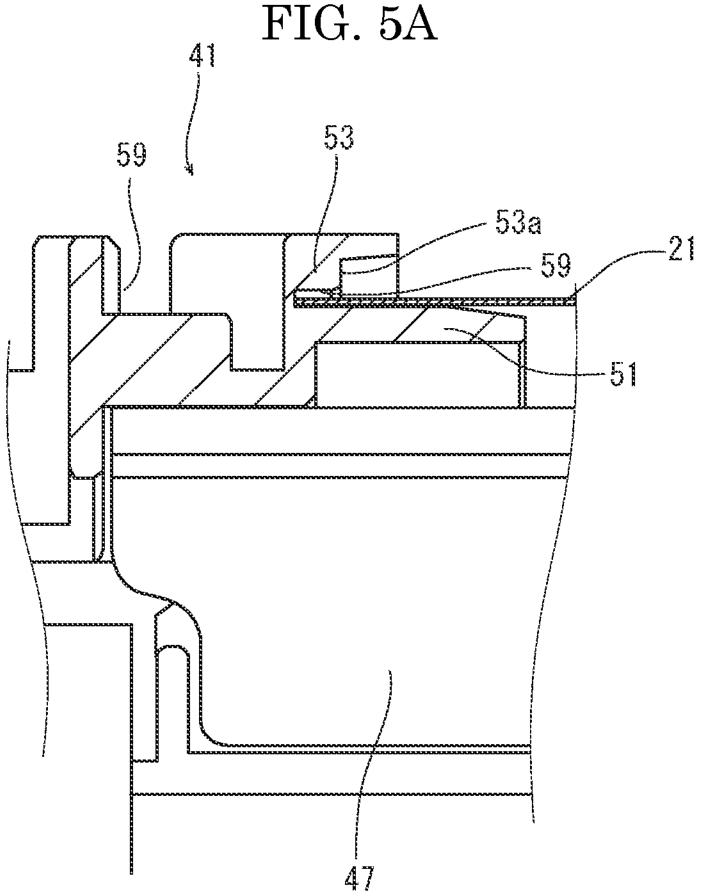
FIG. 5A is a sectional view showing the end portion holder and a fixing belt in the fixing device according to the embodiment of the present disclosure.
Figure 5B:
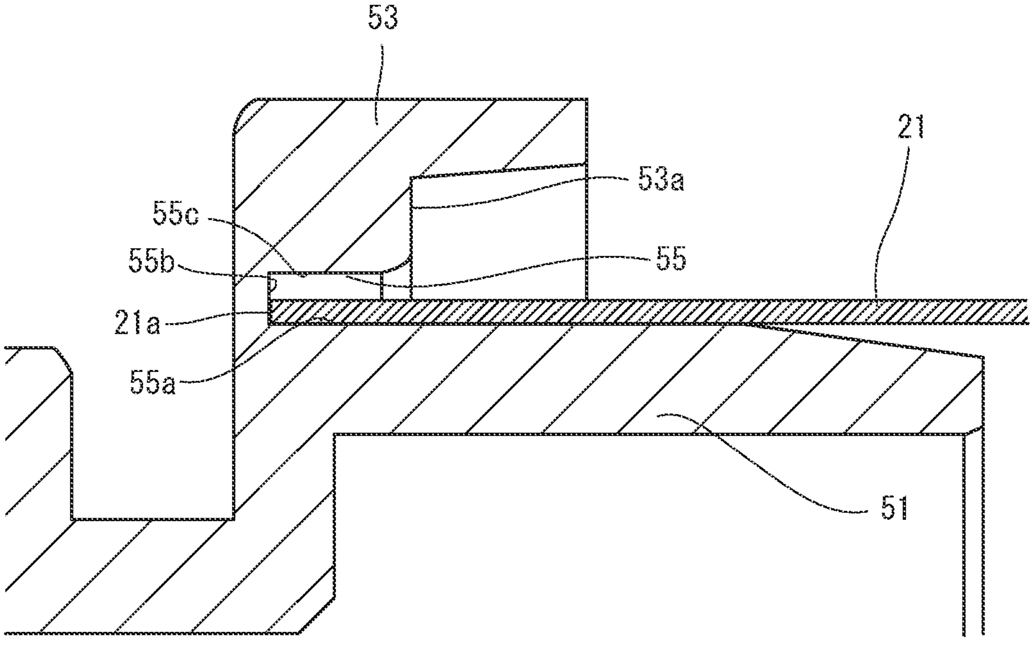
FIG. 5B is an enlarged sectional view showing a part of FIG. 5A.

Next, the end portion holder 41 will be described with reference to FIG. 4, FIG. 5A and FIG. 5B. FIG. 4 is a perspective view showing the end portion holder 41, and FIG. 5A and FIG. 5B are sectional views showing the end portion holder 41.

The end portion holder 41 has a cylindrical part 51 on which the inner circumferential surface of the end portion of the fixing belt 21 slides, and an end wall part 53 which faces the end surface 21*a* of the fixing belt 21. The end portion holder 41 is made of resin such as LCP or PPS.

The cylindrical part 51 has an arc-shaped cross section viewed from the axial direction, and has a diameter slightly larger than that of the fixing belt 21. Between both the circumferential ends of the cylindrical part 51 is opened downward.

The end wall part 53 has a flat facing surface 53*a* parallel to the end surface 21*a* of the fixing belt 21. The cylindrical part 51 is integrally fixed with the end wall part 53 such that the axial direction is perpendicular to the facing surface 53*a*. On the facing surface 53*a*, a groove 55 is formed along the outer circumference of the cylindrical part 51. The groove 55 is formed parallel to the axial direction of the cylindrical part 51, and the inner circumferential surface 55*a* of the groove 55 is on the same surface as the outer circumferential surface of the cylindrical part 51. The corner between the outer circumferential surface 55*c* of the groove 55 and the facing surface 53*a* of the end wall part 53 is rounded. The width of the groove 55 (the length in the radial direction of the cylindrical part 51) is slightly thicker than the thickness of the fixing belt 21, and is 1 mm in one example, and the depth of the groove 55 (the length in the axial direction of the cylindrical part 51) is 3 mm in one example.

In the initial state, there is a predetermined space between the end surface 21*a* of the fixing belt 21 and the facing surface 53*a* of the end wall part 53. That is, there is a predetermined space between the end surface 21*a* of the fixing belt 21 and the groove 55.

On both sides of the end wall part 53, slits 59 along the upper-and-lower direction are formed. The width of the slit 59 is about the thickness of the side plate 31 of the fixing frame 29. When the belt assembly 23 is assembled into the fixing frame 29, the end portion holders 41 of the belt assembly 23 are inserted into guide grooves 37 of both the side plates 31 of the fixing frame 29, as shown in FIG. 3. At this time, with the slits 59 of the end wall part 53 of the end portion holder 41 being engaged with the side plates 31 on both sides of the guide groove 37, the end wall part 53 is caused to be moved downward along the guide groove 37. The end wall part 53 is moved until it abuts on the lower edge of the guide groove 37 of the side plate 31. Then, the fixing belt 21 of the belt assembly 23 is pressed against the pressure roller 25 of the pressure roller assembly 27 by the pushing member 45, and a fixing nip N is formed between the fixing belt 21 and the pressure roller 25. After the belt assembly 23 is thus supported between the side plates 31 of the fixing frame 29, the belt assembly 23 is immovably supported by the fixing frame 29 with the cover plate 35.

The fixing operation in the fixing device 9 having the above configuration will be described. During the fixing operation, when the pressure roller 25 is driven by the drive motor to be rotated, the fixing belt 21 is rotated following the rotation of the pressure roller 25 (see the arrow in FIG. 3). At this time, the end portions of the fixing belt 21 slide along the cylindrical parts 51 of the end portion holders 41. In addition, the halogen heater 43 is driven to radiate radiant heat to the fixing belt 21 to heat the fixing belt 21. When the sheet is conveyed to the fixing nip N, the toner image on the sheet is heated and pressurized to be fixed on the sheet.

The fixing belt 21 slides along the outer circumferential surfaces of the cylindrical parts 51 of the end portion holders 41 as described above. When the fixing belt 21 is rotated normally, the end surface 21*a* of the fixing belt 21 faces the facing surface 53*a* of the end wall part 53, and there is a predetermined gap between the end surface 21*a* and the facing surface 53*a*.

On the other hand, when the fixing belt 21 meanders, the fixing belt 21 moves in the direction of one end portion holder 41 while sliding along the outer circumferential surface of the cylindrical part 51, and eventually enters the groove 55. The fixing belt 21 moves toward the bottom surface 55*b* of the groove 55 while sliding along the inner circumferential surface 55*a* of the groove 55. Then, the end surface 21*a* of the fixing belt 21 eventually abuts on the bottom surface 55*b* of the groove 55 (see FIG. 5B), and a stress is applied from the bottom surface 55*b* to the end surface 21*a* of the fixing belt 21 along the axial direction of the fixing belt 21. Here, since the inner circumferential surface of the end portion of the fixing belt 21 is in contact with the outer circumferential surface of the cylindrical part 51 and the inner circumferential surface 55*a* of the groove 55, the end portion of the fixing belt 21 is restrained from warping inward in the radial direction. Then, the end portion of the fixing belt 21 tries to warp outward in the radial direction. However, the outer circumferential surface of the end portion of the fixing belt 21 faces the outer circumferential surface 55*c* of the groove 55 with a predetermined interval. Thus, the radial outward warping (turning up) of the end portion of the fixing belt 21 is restrained by the outer circumferential surface 55*c* of the groove 55. Thus, the outer circumferential surface 55*c* of the groove 55 is an example of a restraint part that restrains the turning up of the end portion of the fixing belt 21 in this disclosure.

As described above, according to the fixing device 9 of the present disclosure, since the turning up of the end portion of the fixing belt 21 is restrained by the outer circumferential surface 55*c* of the groove 55, even when the fixing belt 21 meanders, the fixing belt 21 can be stably rotated without tuning up or buckling. Since the width of the groove 55 is larger than the thickness of the fixing belt 21, the end portion of the fixing belt 21 may be slightly turned up, but since the amount of turned up portion is small, the rotation of the fixing belt 21 is not affected.

Moreover, since the meandering amount of the fixing belt 21 can be lengthened by the depth of the groove 55, a certain degree of meandering of the fixing belt 21 is allowed.

In addition, since the base layer of the fixing belt 21 is made of resin, the manufacturing cost of the fixing belt 21 can be reduced. When the base material layer is made of resin, the fixing belt 21 is not rigid enough and tends to be turned up when it meanders, but by providing the restraint part (the outer circumferential surface 55*c* of the groove 55) to restrain the tuning up as described in the present disclosure, the rotation of the fixing belt 21 during meandering can be stabilized even in the fixing belt 21 having the base l layer made of resin. Furthermore, since the end portion holder 41 is also made of resin such as LCP or PPS, the manufacturing cost can be reduced and the weight can be reduced.

Figure 6:
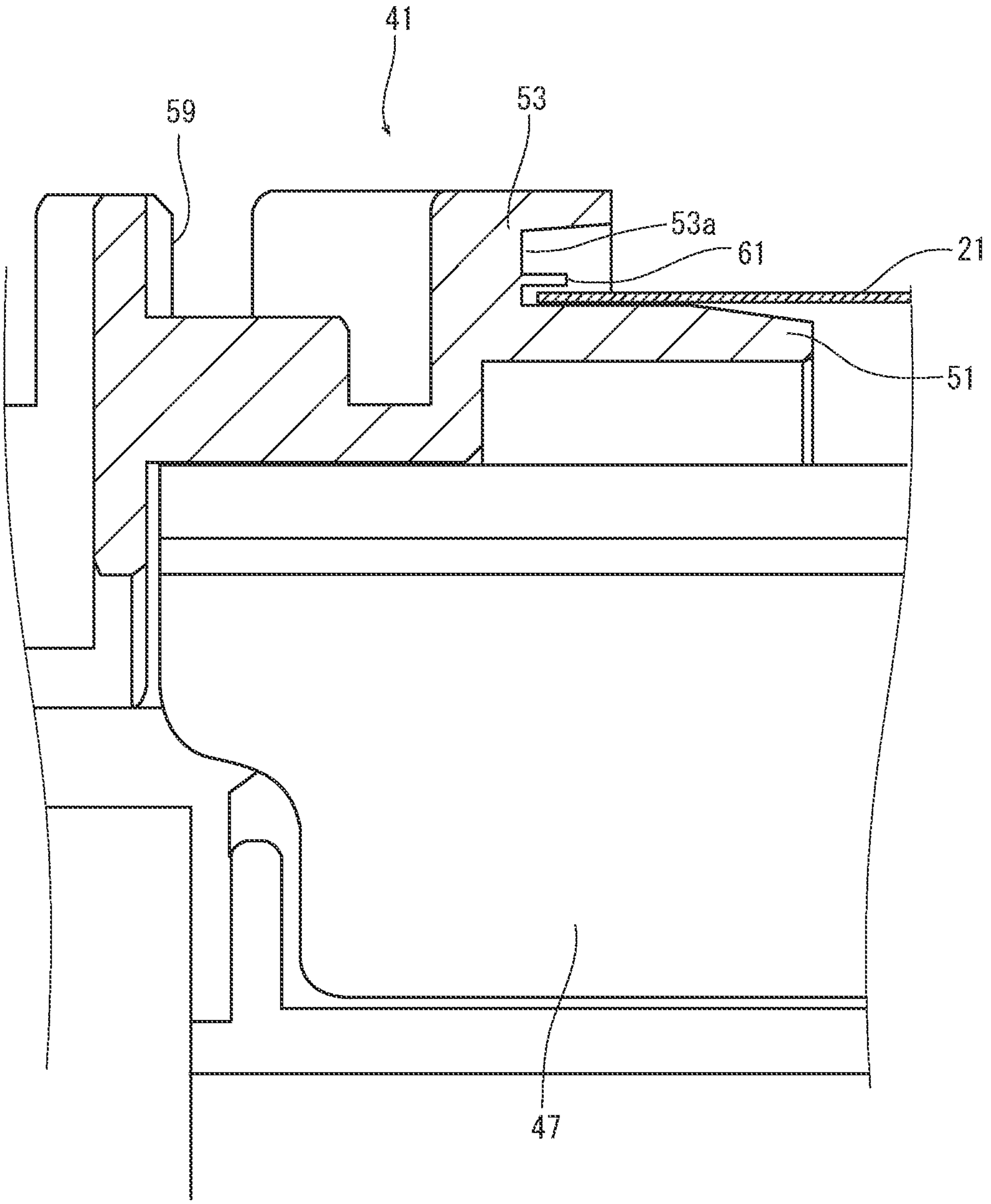
FIG. 6 is a sectional view showing another example of the end portion holder in the fixing device according to the embodiment of the present disclosure.

Another example of the end portion holder 41 will now be described with reference to FIG. 6. In this example, an axially extending rib 61 is formed on the facing surface 53*a* of the end wall part 53 along the circumferential direction of the cylindrical part 51. Between the rib 61 and the cylindrical part 51, there is a space equal to or larger than the width of the fixing belt 21.

Again in this example, if the fixing belt 21 meanders and the end surface 21*a* of the fixing belt 21 abuts against the facing surface 53*a* and tries to be turned up outward in the radial direction, the radially outward warping (turning up) of the end portion of the fixing belt 21 is restrained by the inner circumferential surface of the rib 61. Thus, the inner circumferential surface of the rib 61 is an example of a restraint part that restrains the rolling up of the end portion of the fixing belt 21 in this disclosure.

While this disclosure has been described for specific embodiment (s), this disclosure is not limited to the above. To the extent that it does not deviate from the scope and spirit of this disclosure, a person skilled in the art may modify the above embodiment.

The invention claimed is:

1. A fixing device comprising:

a rotatable endless fixing belt; and an end portion holder which supports each of end portions of the fixing belt rotatably, has a cylindrical part along which an inner circumferential surface of the fixing belt slides and an end wall part which faces an end surface of the fixing belt, and is non-rotatably supported by a fixing frame, wherein the end wall part has a restraint part which faces an outer circumferential surface of the fixing belt with a predetermined interval and restrains the fixing belt from turning up, the end wall part has a groove along a circumferential direction of the cylindrical part, into which the end portion of the fixing belt can enter, the restraint part is an outer circumferential surface of the groove, and when the fixing belt is rotated normally, the end portion of the fixing belt does not enter the groove.

2. The fixing device according to claim 1, wherein the groove is provided parallel to an axial direction of the cylindrical part, and an inner circumferential surface of the groove is on the same surface as an outer circumferential surface of the cylindrical part.

3. The fixing device according to claim 1, wherein the fixing belt has a base layer made of resin.

4. The fixing device according to claim 1, wherein the end portion holder is made of resin.

5. An image forming apparatus comprising:

an image forming part which forms a toner image on a sheet; and the fixing device according to claim 1, which fixes the toner image formed by the image forming part on the sheet.

6. A fixing device comprising:

a rotatable endless fixing belt; and an end portion holder which supports each of end portions of the fixing belt rotatably, has a cylindrical part along which an inner circumferential surface of the fixing belt slides and an end wall part which faces an end surface of the fixing belt, and is non-rotatably supported by a fixing frame, wherein the end wall part has a restraint part which faces an outer circumferential surface of the fixing belt with a predetermined interval and restrains the fixing belt from turning up, the end wall part has a rib extending an axial direction of the cylindrical part along a circumferential direction of the cylindrical part, and the restraint part is an inner circumferential surface of the rib.

7. The fixing device according to claim 6, wherein the fixing belt has a base layer made of resin.

8. The fixing device according to claim 6, wherein the end portion holder is made of resin.

9. An image forming apparatus comprising:

an image forming part which forms a toner image on a sheet; and the fixing device according to claim 6, which fixes the toner image formed by the image forming part on the sheet.

* * * * *